United States Patent [19]

Blom et al.

[11] 4,288,653

[45] Sep. 8, 1981

[54] DISTRICT-HEATING LINE AND A METHOD OF MANUFACTURING THE SAME

[76] Inventors: Hans Blom, Box 3158, S-103 63 Stockholm; Leif Wiberg, 15 Observatoriegatan, S-113 25 Stockholm, both of Sweden

[21] Appl. No.: 130,725

[22] Filed: Mar. 17, 1980

[30] Foreign Application Priority Data

Jun. 18, 1979 [SE] Sweden ............................... 7905331

[51] Int. Cl.$^3$ ........................ F17D 5/06; F16L 55/00
[52] U.S. Cl. ..................................... 174/47; 29/433; 73/40.5 R; 137/551; 156/79; 174/11 R; 264/46.5; 264/229; 340/605
[58] Field of Search ................... 174/11 R, 47, 96, 98, 174/110 F; 73/40.5 R, 49.1; 137/551; 138/33, 103, 104; 165/11 R; 200/61.04, 61.05; 219/301; 237/13; 324/52, 61 R, 65 R; 338/34, 35; 340/604, 605; 361/49; 29/433, 825; 156/47, 51, 56; 264/46.5, 229, 238

[56] References Cited

U.S. PATENT DOCUMENTS

| 243,282 | 6/1881 | Maxwell | 264/229 X |
| 4,013,924 | 3/1977 | Christensen et al. | 174/11 R X |

FOREIGN PATENT DOCUMENTS

| 579184 | 6/1933 | Fed. Rep. of Germany | 324/52 |
| 2640161 | 3/1978 | Fed. Rep. of Germany | 174/11 R |
| 1377519 | 9/1964 | France | 73/40.5 R |
| 1455415 | 11/1976 | United Kingdom | 219/301 |
| 612102 | 6/1978 | U.S.S.R. | 137/551 |

Primary Examiner—Laramie E. Askin
Attorney, Agent, or Firm—Kinzer, Plyer, Dorn & McEachran

[57] ABSTRACT

A district-heating line comprising an inner metal tube intended for the transfer of heating medium and encircled by an insulating layer of foamed plastic. Arranged around the insulating layer is a protective tube. To enable an alarm to be given in the event of a fault in the line, there is fixedly mounted on the outer cylindrical surface of the metal tube, an elongated block which carries at least one alarm conductor, said conductor being grouted in a fixed position in an associated channel in the block by the foamed plastic insulating material. In this way, the alarm conductor can be fixed at a given distance from the metal tube, to facilitate the localizing of a fault.

4 Claims, 3 Drawing Figures

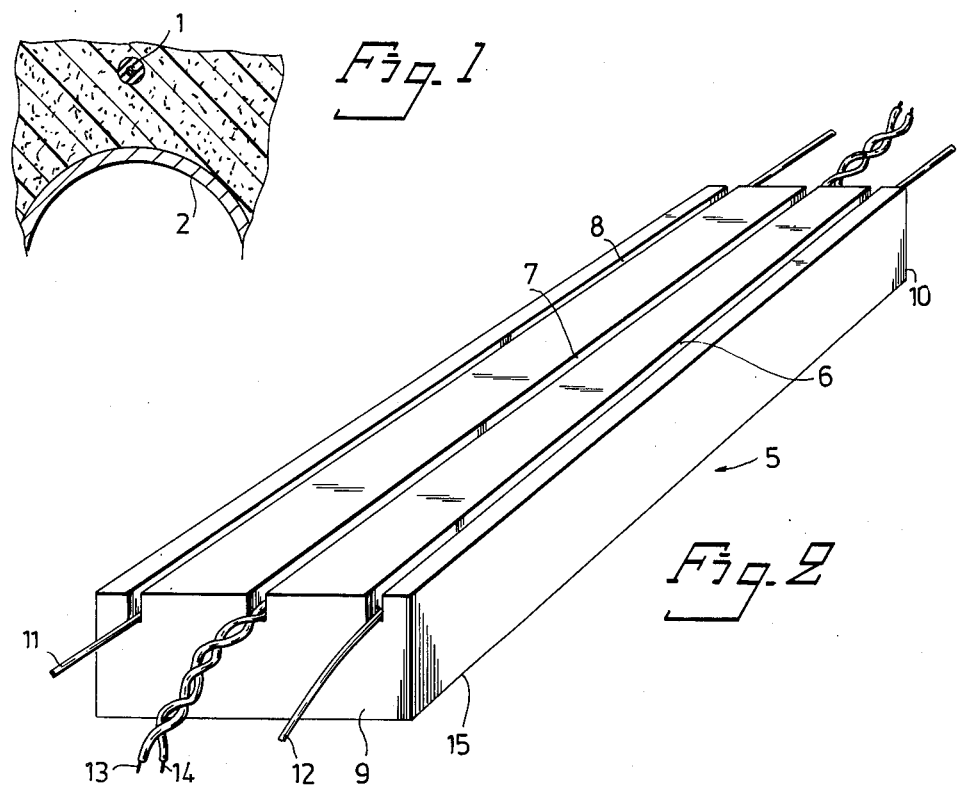
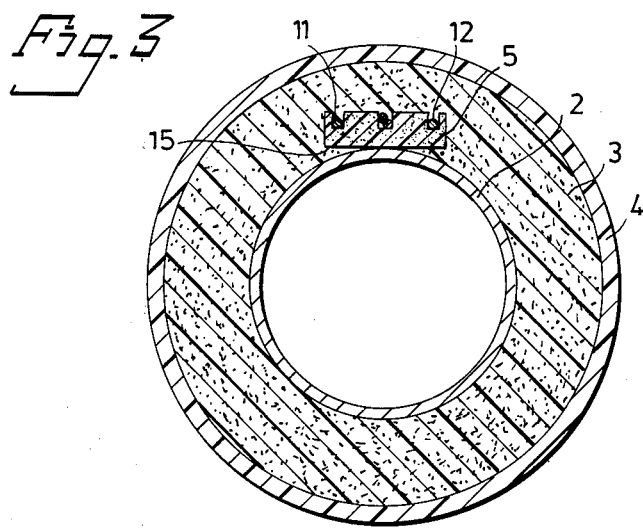

DISTRICT-HEATING LINE AND A METHOD OF MANUFACTURING THE SAME

The present invention relates to a district-heating line of the kind comprising an inner metal tube for transporting a heat-transfer medium; an insulating layer of formed plastic arranged around the inner metal tube; a moisture impenetrable protective tube surrounding said insulating layer; and at least one electric conductor which is arranged in the insulating layer and which is intended to form part of an electric circuit.

District-heating lines of this kind are well-known. In certain cases, only one conductor is used which, together with the metal tube, forms the electric circuit which, if water should penetrate the foam-plastic insulation as a result of, for example, a crack in the protective tube, is closed, owing to the fact that the resistance between the conductor, which extends along the whole of the metal tube, and said metal tube decreases and finally becomes so low that the circuit is closed, wherewith monitoring equipment connected between the conductor and the metal tube causes an alarm to be given. When water penetrates the foam-plastic insulation, the alarm is given substantially irrespective of the distance of the conductor from the metal tube and this distance can vary greatly along the whole length of the tube. In other cases there are used two mutually separated long-insulated conductors in the foam-plastic layer in order to indicate an interruption in the current flow. The reason why there is obtained a variation in distance between the conductors themselves and the conductors and the metal tube is because, as the plastic insulating substance hardens, said substance being poured in liquid form into the annular space between the metal tube and the outer, concentric protective tube subsequent to drawing the conductors through said space and optionally providing spacers to hold them at a distance from said metal tube, said conductors are displaced in an uncontrollable manner as the foam-plastic hardens.

When a fault occurs in such a district-heating line and an alarm is given as a result thereof, it is difficult to determine the actual location of the fault. If the alarm conductor or conductors is or are not located at an exact given distance from the inner tube, which is normally made of steel, it is impossible to localize the fault with sufficient accuracy, as will hereinafter be explained, and thus it is necessary to excavate unnecessary stretches of, for example, a street or road in order to locate the fault in the district-heating line and to repair the line.

When localizing a fault, subsequent to said alarm being given, there is normally used a pulse-reflector meter arranged to transmit an electric pulse which is reflected at the site of the fault, i.e. the location on the district-heating line which, as a result of water penetrating thereinto, has a low resistivity. The time distance between the transmitted pulse and the reflected pulse represents twice the distance to the fault. As will be understood from the following, the characteristic impedance $Z_o$ of the alarm conductor or conductors and the relative dielectric constant $k_e$ are of essential importance to the accuracy at which the fault can be located.

The objection of the present invention is to provide a district-heating line of the aforementioned kind in which the characteristic impedance of the alarm conductor or conductors and the relative dielectric constant are well-defined, so that an exact measurement of the distance from a given point, for example a check station, to the fault location can be made. A further object is to provide a method by which a district-heating line can be made.

All essential characteristic features of the invention are disclosed in the accompanying claims, and the invention and the theory upon which it is based are described hereinafter with reference to the accompanying drawings, in which FIG. 1 illustrates an electric conductor located above an earth plate, which comprises the inner metal tube of the district-heating line, FIG. 2 is a perspective view of one embodiment of an elongate block according to the invention having electrical conductors laid therein, and FIG. 3 illustrates the block shown in FIG. 2 arranged in a district-heating line.

In order to give an understanding of the appearance of electric pulses on an alarm conductor, reference is made to FIG. 1, which shows an alarm conductor 1 disposed in a dielectric medium and arranged above the inner metal tube 2 of the district-heating line.

The following relationship applies to FIG. 1:

$$V = \frac{Q}{2\pi \epsilon_0} \ln \frac{4h - d}{d},$$

in which
 V = the potential difference between the conductor 1 and the metal tube 2,
 Q = the charge on conductor 1
 $\epsilon_o$ = the dielectric constant of the medium
 h = the perpendicular distance of the conductor 1 from the tube, and
 d = the diameter of the conductor 1.

If one inserts the definition relative dielectric constant $k_e$ with the definition $$k_e = \frac{\text{the capacity of a capacitor having a given dielectric}}{\text{the capacity of the same capacitor with air as the dielectric}}$$

ln = natural logarithm (base e)

the wave-propagation rate of pulse on the conductor 1 can be defined as $$v_f = \frac{c}{\sqrt{k_e}},$$

where
 $v_f$ = the wave propagation rate in km/s
 c = the speed of light $\approx 3 \cdot 10^5$ km/s
 $k_e$ = the given relative dielectric constant.

$v_f$ is not affected by the area of the conductor 1.

The following tables show the values of $k_e$ and $v_f$ for different dielectrics.

| | $k_e$ | relative $v_f$ |
|---|---|---|
| Air | 1 | 1 |
| Foamed polyurethane | 1.2 | 1.91 |
| Tefzel (Fluoropolymer ETFE) | 2.6 | 0.62 |
| Paper | 4 | 0.5 |
| Conductors in paper tubes (foam therebetween) | 1.56 | 0.8 (x) |
| Taped Tefzel conductors | 1.93 | 0.72 (x) |
| Water (100° C.) | 56 | 0.13 |
| Water (70° C.) | 64 | 0.12 |

| | $k_e$ | relative $v_f$ |
|---|---|---|
| Water (20°C.) | 80 | 0.11 |

(x = values found through experience)

In the case of a single conductor 1 according to FIG. 1 located above an earth plane, in this case metal tube 2, $$Z_o = \frac{60}{\sqrt{k_e}} \cdot \ln \frac{2h}{r},$$

in which $Z_o 32$ the characteristic impedance of the conductor in ohms.

$k_e$=the dielectric constant (undimensional)

h=the distance from the centre point of the conductor 1 to the surface of the tube 2 in centimeters, and r=the radius of the conductor 1 in centimeters.

It will be seen from the formula $Z_o$ that changes in impedance take place along the district-heating line when the distance between the conductor 1 and the metal tube 2 varies. The magnitude of these changes increases with decreasing distance to the tube 2. As an example of the changes in impedance, reference can be made to the following table:

| | |
|---|---|
| A copper conductor in polyurethane foam at a distance of 10 mm from the steel tube: | $Z_o = 180$ |
| A copper conductor in polyurethane foam at a distance of 15 mm from the steel conductor: | $Z_n = 200$ |
| A copper conductor in polyurethane foam at a distance of 20 mm from the steel tube: | $Z_o = 218$ |
| A copper line in a paper tube having a wall thickness of 1.5 mm: | $Z_o = 54$ |
| A copper conductor in a paper tube having a distance of 5 mm to the steel tube: | $Z_o = 130$ |
| A Tefzel insulated conductor Outside diameter = 2 mm, Inside diameter = 1.5 mm)k, ideally taped against the steel tube: | $Z_o = 50$ |
| Tefzel insulated conductor at a distance of 5 mm from the steel tube: | $Z_o = 150$ |

When considering a non-insulated copper conductor incorporated as a measuring conductor in polyurethane foam, it will be seen that a deviation from 10 to 20 mm results in an increase of the impedance of 66%, while when considering a Tefzel insulated conductor placed against the metal tube it will be seen that the deviation of 5 mm results in a change in impedance of 200%. These deviations are quite normal in conventional district-heating lines.

As previously mentioned, the location of the conductor relative to the steel tube has no relevance in the sounding of an alarm. If the distance of the conductor from the steel tube varies, however, it will make it difficult to localize the fault, because of the aforeshown changes in $Z_o$ and $k_e$. Variations in $Z_o$ give rise to reflections; echoes are obtained on the screen of the pulse reflector meter which do not originate from fault locations, such as moisture, short circuits or broken conductors, but from locations at which the alarm conductor comes closer to the steel tube. The echo image is extremely difficult to interpret, because of these undesirable and non-defined echoes. Variations in $k_e$ directly affect $v_f$ and therewith the accuracy of localizing a fault.

Thus, it is extremely important that the conductor or conductors can be placed at an accurately given distance from the metal tube along the whole length thereof, and that this distance is maintained irrespective of structural changes in the foam-plastic insulation.

To this end one or more elongate blocks 5 are firmly mounted on the metal tube 2 prior to casting the foam plastic insulation, which is referenced 3 in FIG. 3 and which is surrounded by an external, moisture impenetrable protective tube 4 made of a suitable plastic material or the like. The block 5 can be fixed to the metal tube 2 by glueing the same to the cylindrical surface of said tube. If a plurality of blocks 5 are arranged in line with each other, the distance between the mutually opposing ends of said blocks should be as small as possible. Each of the blocks 5 has provided therein a number of elongate channels e.g. channel 6,7,8 (FIG. 2) the number of channels corresponding to the number of electrical conductors to be enclosed in the insulation 3. The channels 6,7,8 extend along the whole length of the blocks 5 and exit at the ends 9,10 of the blocks. Subsequent to mounting one or more blocks 5 on the cylindrical surface of the tube 2, the conductors 11,12, 13 and 14 are placed in respective channels and the parts of the conductors extending beyond the ends of the metal tube 2 are stretched or tensioned by some suitable means. Since the blocks 5 are mutually of the same height or thickness, calculated from the metal tube 2, and the channels 8 are mutually of the same depth, the conductor 11 will lie at an exactly defined distance from the metal tube 2. Subsequent to inserting the metal tube 2 with the blocks 5 mounted thereon into a protective tube 4 and subsequent to centering said metal tube 2 in said tube 4, a foamable plastic 3 is introduced into the annular space defined by said tubes. The channels 6 to 8 are filled to a level above the conductors with said foamable-plastic material and become fixed in their respective positions as the material hardens, and the blocks 5 are held in their positions, irrespective of the tensions and forces occurring when the foam-plastic insulation 3 solidifies.

Subsequent changes in the insulation, as a result of aging etc., will not disturb the blocks if they are correctly mounted, and therewith the conductors 11 to 14 will be held at a constant mutual distance therebetween and at a constant distance from the metal tube 2.

The blocks 5 are preferably made of a foam-plastic material of the same kind as that forming the insulation 3, and preferably of also the same density. Other, non-electrically conductive materials can also be used, however.

Although the block 5 shown in FIGS. 2 and 3 has a planar abutment surface 15 for abutment with the metal tube 2, it will be understood that this surface may be curved, with a radius corresponding to the radius of the tube 2, thereby substantially facilitating mounting of the block onto the tube. The block 5 can have any suitable cross-sectional shape whatsoever, for example a cross-sectional shape of a ring segment.

We claim:

1. A district heating line of the kind including an inner metal tube for transporting a heat transfer medium, an insulating layer of foam-plastic material arranged around the metal tube, a moisture impenetrable protective tube surrounding said foam-plastic layer, at least one electrical conductor formed as part of an electrical circuit, elongated blocks mounted on and affixed to the inner metal tube along the length of the tube, said blocks being made of electrically insulating material and having extending along the length thereof at least one radially outwardly opening channel with the channels on adjacent blocks aligned with one another, said channels being dimensioned to accommodate said electrical conductor and position it at a fixed distance from the outer cylindrical surface of the inner metal tube, and means securing said electrical conductor in said channels at said fixed distance from the outer cylindrical surface of the inner metal tube.

2. The district heating line of claim 1 in which the elongated blocks are made of a foam-plastic material.

3. The district heating line of claim 1 in which said electrical conductor is stretched when accommodated in said channels.

4. A method of manufacturing a district heating line including the steps of forming elongated blocks each having at least one axially extending radially outwardly opening channel dimensioned to receive at least one electrical conductor, attaching a plurality of said elongated blocks to the outer surface of a metal tube with the channels of adjacent blocks in alignment, positioning at least one electrical conductor in the aligned channels and securing said conductor at a fixed distance from said elongated metal tube, arranging a protective tube around and coaxial with the metal tube and elongated blocks, and pouring a hardenable foamable plastic material in the annular chamber between the metal tube and the protective tube.

* * * * *